United States Patent
Earnest-Noble et al.

(10) Patent No.: US 11,928,004 B2
(45) Date of Patent: Mar. 12, 2024

(54) QUANTUM ERROR MITIGATION BASED ON SCALED GATES

(71) Applicant: International Business Machines Corporation, Armonk, NY (US)

(72) Inventors: Nathan Don Earnest-Noble, New York, NY (US); Caroline Tornow, Zurich (CH); Daniel Josef Egger, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 17/643,206

(22) Filed: Dec. 8, 2021

(65) Prior Publication Data
US 2023/0176935 A1   Jun. 8, 2023

(51) Int. Cl.
G06F 11/00   (2006.01)
*G06N 10/40*   (2022.01)
*G06N 10/70*   (2022.01)

(52) U.S. Cl.
CPC .......... *G06F 11/004* (2013.01); *G06N 10/40* (2022.01); *G06N 10/70* (2022.01)

(58) Field of Classification Search
CPC ...... G06F 11/004; G06N 10/40; G06N 10/70; G06N 10/20
USPC ....................................................... 714/1–57
See application file for complete search history.

(56) References Cited

U.S. PATENT DOCUMENTS

| | | | |
|---|---|---|---|
| 7,102,547 B2 | 9/2006 | Jensen | |
| 10,325,218 B1* | 6/2019 | Zeng | G06N 10/00 |
| 10,452,991 B1* | 10/2019 | Ganzhorn | B82Y 10/00 |
| 10,755,193 B2 | 8/2020 | Kandala et al. | |
| 2014/0365843 A1* | 12/2014 | Ashikhmin | G06F 11/10 |
| | | | 714/758 |
| 2017/0286858 A1* | 10/2017 | La Cour | G06F 7/523 |
| 2017/0308803 A1* | 10/2017 | Wallman | G06F 11/004 |
| 2017/0351967 A1* | 12/2017 | Babbush | G06N 20/00 |
| 2019/0245540 A1* | 8/2019 | Raeisi | H03K 19/00369 |

(Continued)

OTHER PUBLICATIONS

Earnest, et al., "Pulse-efficient circuit transpilation for quantum applications on cross-resonance-based hardware," arXiv:2105.01063v1 [quant-ph] May 3, 2021.

(Continued)

*Primary Examiner* — Sarai E Butler
(74) *Attorney, Agent, or Firm* — Amin, Turocy & Watson, LLP

(57) ABSTRACT

Techniques regarding quantum error mitigation are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an error mitigation component that can add a set of scaled quantum gates to a quantum circuit for error mitigation. The set of scaled quantum gates can comprise a quantum gate and an inverse of the quantum gate. Also, the set of scaled quantum gates can have a rotation angle based on a pulse schedule to achieve a target stretch factor.

20 Claims, 12 Drawing Sheets

(56) References Cited

U.S. PATENT DOCUMENTS

2020/0175409 A1* 6/2020 Kandala ............... G06N 10/00
2021/0406749 A1* 12/2021 Oliver ............... H03M 13/6508

OTHER PUBLICATIONS

Kandala, et al., "Hardware-efficient Variational Quantum Eigensolver for Small Molecules and Quantum Magnets," Nature 549, 242 (2017), DOI: 10.1038/nature23879.

Stamatopoulos, et al., "Option Pricing using Quantum Computers," Quantum 4, 291 (2020), DOI: 10.22331/q-2020-07-06-291.

Anonymous, "Method and system to create and deploy Cloud containerized quantum-based web applications using API-exposed quantum computers as back-end," IP.com No. IPCOM000258553D, IP.com Electronic Publication Date: May 23, 2019, https:/priorart.ip.com/IPCOM/000258553.

Anonymous, "A Method for Low-Latency Closed-Loop Pulse Calibration," IP.com No. IPCOM000265304D, IP.com Electronic Publication Date: Mar. 23, 2021, https://ip.com/IPCOM/000265304.

Anonymous, "Scheduling Quantum Circuit for Noise Simulation," IP.com No. IPCOM000265861D, IP.com Electronic Publication Date: May 20, 2021, https://ip.com/IPCOM/000265861.

Mell et al., The NIST Definition of Cloud Computing, Recommendations of the National Institute of Standards and Technology, NIST Special Publication 800-145, Sep. 2011, 7 pages.

International Search Report and Written Opinion for International Application No. PCT/EP2022/084305 dated Feb. 17, 2023.

Kandala Abhinav et al: "Error mitigation extends the computational reach of a noisy quantum processor", Nature, Nature Publishing Group UK, London, vol. 567, No. 7749, Mar. 27, 2019 (Mar. 27, 2019), pp. 491-495, XP036742080, ISSN: 0028-0836, DOI: 10.1038/S41586-019-1040-7 [retrieved on Mar. 27, 2019] abstract p. 491-p. 494.

Ryan Larose et al: "Mitiq: A software package for error mitigation on noisy quantum computers", arxiv.org, Cornell University Library, 201 Olin Library Cornell University Ithaca, NY 14853, Jul. 7, 2021 (Jul. 7, 2021), XP091000649, abstract section IV, IX.

* cited by examiner

QUANTUM ERROR MITIGATION BASED ON SCALED GATES

BACKGROUND

The subject disclosure relates to error mitigation in quantum circuits, and more specifically, to the incorporation of scaled quantum gates into a quantum circuit to achieve one or more stretch factors that can control an amount of noise experienced by the quantum circuit.

Quantum computers can suffer from inherent noise that can be present through the runtime of a quantum circuit. For example, qubit operations of the quantum circuit can be associated with an error value originating from one or more sources of noise, such as coherence time of the qubits. The error value can degrade the computational results of the quantum circuit. Further, the amount of error can increase as the number of qubit operations and/or circuit components (e.g., quantum gates) increases. To mitigate the amount of error in the quantum circuit results, quantum error mitigation techniques introduce controlled amounts of noise to the quantum circuit to extrapolate a noise-free result.

An example quantum error mitigation technique is Richardson extrapolation, in which a quantum circuit is run with varying circuit runtimes and each run corresponds to a given stretch factor. There is a pulse-based approach and a digital-based approach to Richardson extrapolation. The pulse-based Richardson extrapolation is implemented by changing the pulse schedule duration for the same set of quantum gates needed to run a quantum circuit. Multiple copies of an identical gate set, but implemented by schedules with different durations, can be tuned and used to run the same quantum circuit. The digital-based Richardson extrapolation is implemented by inserting noisy quantum gates as a way to extend the quantum circuit runtime. Typically, two CNOT gates, which comprise the identity gate, are inserted for each CNOT gate in the original quantum circuit.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can perform quantum error mitigation are described.

According to an embodiment, a system is provided. The system can comprise a memory that can store computer executable components. The system can also comprise a processor, operably coupled to the memory, and that can execute the computer executable components stored in the memory. The computer executable components can comprise an error mitigation component that can add a set of scaled quantum gates to a quantum circuit for error mitigation. The set of scaled quantum gates can comprise a quantum gate and an inverse of the quantum gate. Also, the set of scaled quantum gates can have a rotation angle based on a pulse schedule to achieve a target stretch factor. An advantage of such a system can be an enhanced stretch factor resolution employed in error mitigation.

In some examples, the rotation angle of the set of scaled quantum gates can control an amount of noise experienced by the quantum circuit. An advantage of such a system can be the control of noise introduction via quantum gates that need not be calibrated.

According to an embodiment, a computer-implemented method is provided. The computer-implemented method can comprise adding, by a system operatively coupled to a processor, a set of scaled quantum gates to a quantum circuit for error mitigation. The set of scaled quantum gates can comprise a quantum gate and an inverse of the quantum gate. Also, the set of scaled quantum gates can have a rotation angle based on a pulse schedule to achieve a target stretch factor. An advantage of such a computer-implemented method can be the use of quantum error mitigation techniques with quantum circuits of various depths.

In some examples, the computer-implemented method can comprise inserting, by the system, a set of quantum gates into the quantum circuit based on a target quantum gate being present in the quantum circuit. An advantage of such a computer-implemented method can be the use of inserted sets of quantum gates to facilitate Richardson extrapolation algorithms in a cloud-based computing environment.

According to an embodiment, a computer program product for mitigating error of a quantum circuit is provided. The computer program product can comprise a computer readable storage medium having program instructions embodied therewith. The program instructions can be executable by a processor to cause the processor to add a set of scaled quantum gates to the quantum circuit. The set of scaled quantum gates can comprise a quantum gate and an inverse of the quantum gate. Also, the set of scaled quantum gates can have a rotation angle based on a pulse schedule to achieve a target stretch factor. An advantage of such a computer program product can be an increase in the allowable circuit depth for execution of a Richardson extrapolation algorithm.

In some examples, the program instructions can further cause the processor to extract a calibration of the target quantum gate to determine a pulse implementation of the target quantum gate. Also, the program instructions can further cause the processor to generate the pulse schedule for the set of quantum gates based on the pulse implementation of the target quantum gate and the target stretch factor. The pulse schedule can scale a rotation angle of the set of quantum gates to define the set of scaled quantum gates. An advantage of such a computer program product can be the enabled implementation of a dense distribution of stretch factor values.

DETAILED DESCRIPTION

Figure 1:
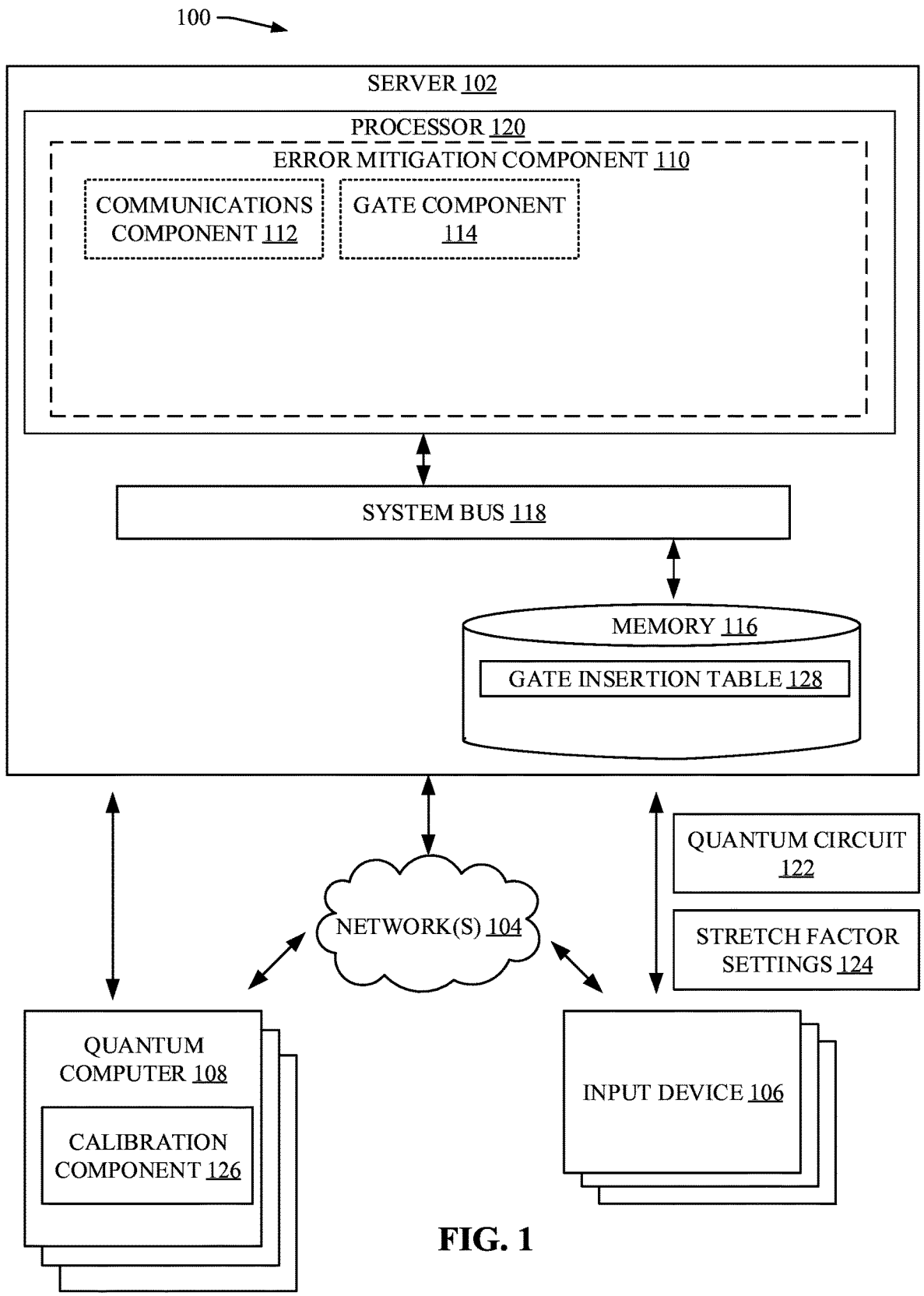
FIG. 1 illustrates a block diagram of an example, non-limiting system that can perform quantum error mitigation via one or more inserted sets of quantum gates implemented with scaled pulse schedules in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Pulse-based Richardson extrapolation requires a large amount of calibration overhead for each stretched pulse schedule. For example, by implementing alternate duration times, other pulse parameters can also be changed. For instance, implementing an X-gate with a longer duration can require scaling the amplitude according and potentially additional parameters. Thus, pulses in the schedule with different parameter values will need calibration, thereby creating a large calibration overhead. Further, digital-based Richardson extrapolation has a limited resolution (e.g., the range of applicable stretch factors is limited based on the number of gates), and consequently cannot be used on quantum circuits with an appreciable circuit depth. Given the problems with other implementations of quantum error mitigation (e.g., pulse-based and digital-based Richardson extrapolation); the present disclosure can be implemented to produce a solution to one or more of these problems by an error mitigation that techniques that inserts into a quantum circuit two-qubit gates having scaled pulse schedules to achieve one or more target stretch factors. Advantageously, one or more embodiments described herein can increase the allowable circuit depth compared to digital-based Richardson extrapolation. Also, various embodiments described herein can be efficiently employed in a cloud computing environment at least because the implemented scaled two-qubit gates need not be calibrated with each pulse schedule (e.g., as required in pulse-based Richardson extrapolation).

Various embodiments of the present invention can be directed to computer processing systems, computer-implemented methods, apparatus and/or computer program products that facilitate the efficient, effective, and autonomous (e.g., without direct human guidance) quantum error mitigation. For example, one or more embodiments described herein can include the insertion of one or more sets of scaled two-qubits gates into a given quantum circuit in association with one or more native gates of the quantum circuit. The inserted gates can be inverses of each other such that the added gates compose to the identity of the original quantum circuit. Further, the pulse schedule of the added two-qubit gates can be scaled to achieve one or more target stretch factors. For instance, the rotation angle of the added two-qubit gates can be based on a pulse schedule that is scaled in comparison to the one or more native gates of the quantum circuit. The quantum circuit, with the added two-qubit gates, can be executed with multiple pulse schedules, with each execution achieving a respective stretch factor and thereby a respective amount of introduced noise. After multiple executions of the modified quantum circuit, the computational results can be extrapolated to a near zero noise determination.

The computer processing systems, computer-implemented methods, apparatus and/or computer program products employ hardware and/or software to solve problems that are highly technical in nature (e.g., quantum error mitigation), that are not abstract and cannot be performed as a set of mental acts by a human. For example, an individual, or a plurality of individuals, cannot execute quantum circuits with various stretch factors controlled by scaled quantum gates to extrapolate a near zero noise computation.

Also, one or more embodiments described herein can constitute a technical improvement over conventional quantum error mitigation by modifying a given quantum circuit to include one or more sets of quantum gates with scaled pulse schedules to achieve target stretch factors. Additionally, various embodiments described herein can demonstrate a technical improvement over conventional quantum error mitigation by employing one or more sets of scaled quantum gates without the large amount of calibration overhead typically required to implement a target pulse schedule. Further, one or more embodiments described herein can have a practical application by enabling a fine resolution of potential stretch factor values that can be implemented via the one or more sets of inserted quantum gates. For instance, various embodiments described herein can have a parametric distribution of potential stretch factors to facilitate greater circuit depth than typical quantum error mitigation techniques.

FIG. 1 illustrates a block diagram of an example, non-limiting system 100 that can mitigate error values in one or more quantum circuit computations. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, input devices 106, and/or quantum computers 108. The server 102 can comprise error mitigation component 110. The error mitigation component 110 can further comprise gate component 114. Also, the server 102 can comprise or otherwise be associated with at least one memory 116. The server 102 can further comprise a system bus 118 that can couple to various components such as, but not limited to, the error mitigation component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the error mitigation component 110 can be provided on the one or more servers 102, it should be appreciated that the architecture of system 100 is not so limited. For example, the error mitigation component 110, or one or more components of error mitigation component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more quantum circuits 122 and/or stretch factor settings 124 into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, the one or more input devices 106 can be employed to enter one or more quantum circuits 122 into the system 100. In various embodiments, the error mitigation component 110 can employ various quantum error mitigation techniques described herein to mitigate the amount of error associated with computations resulting from executing the one or more quantum circuits 122. For instance, the one or more quantum computers 108 can employ the one or more quantum circuits 122 to execute one or more quantum algorithms. The one or more quantum circuits 122 can delineate a computational routine for the one or more quantum computers 108. For example, the one or more quantum circuits 122 can describe one or more coherent quantum operations on quantum data. In various embodiments, the one or more quantum circuits 122 can delineate the number of qubits and/or qubit connectivity employed by the one or more quantum computers 108 to execute one or more quantum algorithms. For instance, the one or more quantum circuits 122 can describe, with regards to one or more qubits: initialization and reset operations (e.g., initialization of one or more qubits to one or more desired states), quantum gates (e.g., Hadamard gates, phase shifter gates, controlled gates, uncontrolled gates, phase rotation gate, controlled-NOT ("CNOT") gate, single qubit gates, multi-qubit gates, cross-resonance gates, a combination thereof, and/or the like), measurement operations, and/or classically controlled quantum gates.

Additionally, the one or more input devices 106 can be employed to enter one or more stretch factor settings 124 into the system 100 (e.g., where the one or more stretch factor settings 124 can be stored, for example, in the one or more memories 116). In various embodiments, the one or more quantum gates of the one or more quantum circuits 122 can be driven in accordance with one or more pulse schedules. The pulse schedules can describe a sequence of microwave pulses (e.g., generated by the one or more quantum computers 108) that can be parameterized by, for example, waveform, amplitude, and/or time. In various embodiments, one or more parameters of the microwave pulse that drives a quantum gate can be modified by an increment defined via a stretch factor value. For example, the stretch factor value can define an incremental modification to the waveform, amplitude, and/or time of the driving microwave pulse. For instance, the stretch factor value can define a stretch in the time and/or amplitude of the microwave pulse. In another instance, the stretch factor value can define a scaling of the pulse time, rise-fall times, wait times, constant amplitude portions of a pulse, a combination thereof, and/or the like. Thereby, a stretch factor value can define an amount of alteration to one or more parameters of a microwave pulse that drives a quantum gate. In various embodiments, the one or more stretch factor settings 124 can define a range of stretch factor values to be implemented by the error mitigation component 110. Further, the one or more stretch factor settings 124 can define the microwave pulse parameter to be modified by the stretch factor value. For example, a quantum circuit 122 can be executed via multiple iterations, where each iteration employs a respective stretch factor value from the stretch factor settings 124. By altering the quantum gate pulse schedule with each execution iteration, the quantum circuit 122 can experience different amounts of noise associated with the same quantum computation with each execution. In one or more embodiments, the one or more stretch factor settings 124 can be generated by the error mitigation component 110 and/or the error mitigation component 110 can employ one or more default stretch factor settings 124 (e.g., stored in the one or more memories 116).

In various embodiments, the one or more quantum computers 108 can comprise quantum hardware devices that can utilize the laws of quantum mechanics (e.g., such as superposition and/or quantum entanglement) to facilitate computational processing (e.g., while satisfying the DiVincenzo criteria). In one or more embodiments, the one or more quantum computers 108 can comprise a quantum data plane, a control processor plane, a control and measurement plane, and/or a qubit technology.

In one or more embodiments, the quantum data plane can include one or more quantum hardware components comprising physical qubits, structures to secure the positioning of the qubits, and/or support circuitry. The support circuitry can, for example, facilitate measurement of the qubits' state and/or perform gate operations on the qubits (e.g., for a gate-based system). In some embodiments, the support circuitry can comprise a wiring network that can enable multiple qubits to interact with each other. Further, the wiring network can facilitate the transmission of control signals via a direct electrical connection and/or electromagnetic radiation (e.g., optical, microwave, and/or low-frequency signals). For instance, the support circuitry can comprise one or more superconducting resonators operatively coupled to the one or more qubits. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

In one or more embodiments, the control processor plane can identify and/or trigger a Hamiltonian sequence of quantum gate operations and/or measurements, wherein the sequence executes a program (e.g., provided by a host processor, such as server 102, via error mitigation component 110) for implementing a quantum algorithm (e.g., defined via the one or more quantum circuits 122). For example, the control processor plane can convert compiled code to commands for the control and measurement plane. In one or more embodiments, the control processor plane can further execute one or more quantum error correction algorithms.

In one or more embodiments, the control and measurement plane can convert digital signals generated by the control processor plane, which can delineate quantum operations to be performed, into analog control signals to perform the operations on the one or more qubits in the quantum data plane. Also, the control and measurement plane can convert one or more analog measurement outputs of the qubits in the data plane to classical binary data that can be shared with other components of the system 100 (e.g., such as the error mitigation component 110, via, for example, the control processor plane).

One of ordinary skill in the art will recognize that a variety of qubit technologies can provide the basis for the one or more qubits of the one or more quantum computers 108. Further, the control and measurement plane can include: a laser or microwave source directed at one or more of the ions to affect the ion's quantum state, a laser to cool and/or enable measurement of the ions, and/or one or more photon detectors to measure the state of the ions. In another instance, superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls. Additional exemplary qubit technologies can include, but are not limited to: photonic qubits, quantum dot qubits, gate-based neutral atom qubits, semiconductor qubits (e.g., optically gated or electrically gated), topological qubits, a combination thereof, and/or the like.

In one or more embodiments, the communications component 112 can receive one or more quantum circuits 122 from the one or more input devices 106 (e.g., via a direct electrical connection and/or through the one or more networks 104) and share the data with the various associate components of the error mitigation component 110. Additionally, the communications component 112 can facilitate the sharing of data between the error mitigation component 110 and the one or more quantum computers 108, and/or vice versa (e.g., via a direct electrical connection and/or through the one or more networks 104).

In various embodiments, the gate component 114 can analyze the one or more quantum circuits 122 and identify the native multi-qubit quantum gates of the quantum circuits 122. For example, the gate component 114 can identify each multi-qubit quantum gate included in the one or more quantum circuits 122, such as two-qubit quantum gates. In one or more embodiments, the gate component 114 can identify the type, position, and/or sequence of the multi-qubit quantum gates. For instance, the one or more multi-qubit quantum gates can be depicted within in the one or more quantum circuits 122 via one or more standardized representations, such as lines connecting respective qubit operations. The gate component 114 can scan the one or more quantum circuit 122 and correlate the standardized representations to associate multi-qubit quantum gates.

Figure 2A:
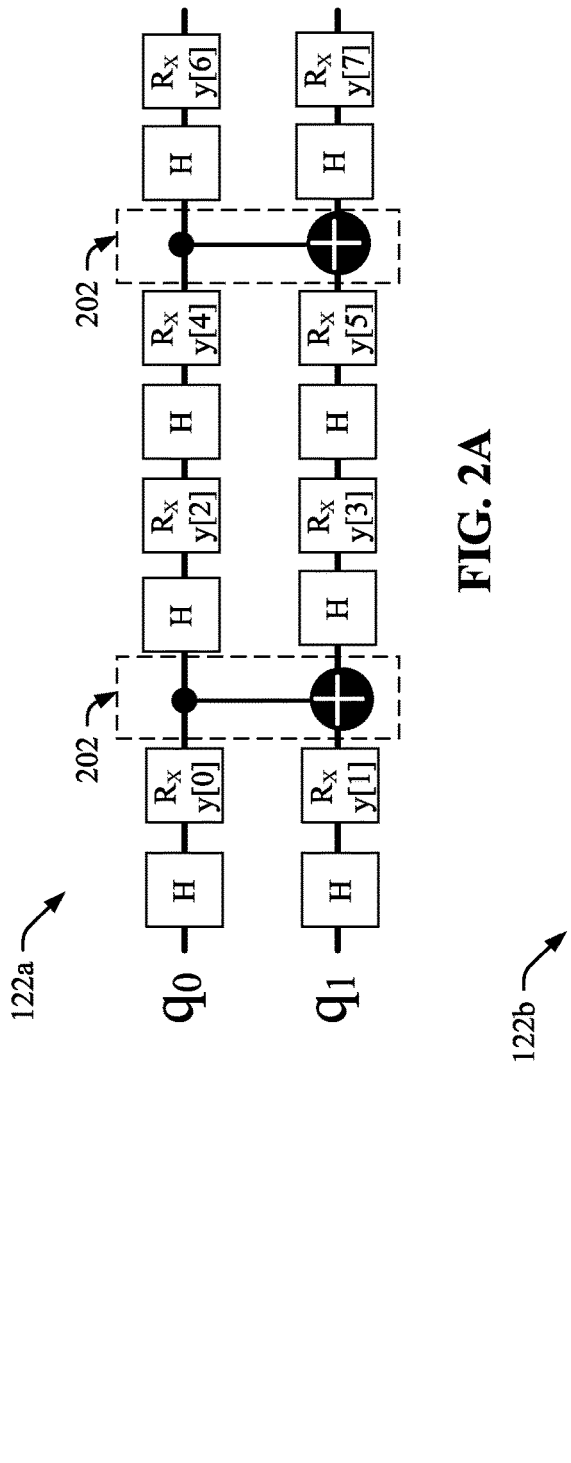
FIG. 2A illustrates a diagram of an example, non-limiting quantum circuit that can be executed to perform one or more quantum algorithms on one or more quantum computers in accordance with one or more embodiments described herein.

FIG. 2A illustrates an example, non-limiting quantum circuit 122a that can be entered into the system 100 via the one or more input devices 106, analyzed by the error mitigation component 110, and/or executed by the one or more quantum computers 108. Repetitive description of like elements employed in other embodiments described herein is omitted for the sake of brevity. As shown in FIG. 2A, the example quantum circuit 122a describes quantum operations with regards to a first qubit $q_0$ and a second qubit $q_1$. Further, the example quantum circuit 122a comprises two CNOT quantum gates 202. The CNOT gates 202 of the example quantum circuit 122a are built from cross-resonance gates (e.g., Hadamard and/or Pauli gates) between the first qubit $q_0$ and a second qubit $q_1$. In various embodiments, the gate component 114 can analyze the example quantum circuit 122a and identify each of the two CNOT quantum gates 202 as multi-qubit gates (e.g., two-qubit gates) comprised within the example quantum circuit 122a.

In various embodiments, the gate component 114 can further query the calibration component 126 for the calibrated parameters associated with each of the identified multi-qubit quantum gates. For example, each multi-qubit quantum gate comprised within the one or more quantum circuits 122 can be implemented via quantum gate hardware comprised within the one or more quantum computers 108. The calibration component 126 can calibrate the hardware to reduce systematic errors in the one or more quantum computers 108. When executing a quantum circuit 122 comprising one or more multi-qubit gates (e.g., two-qubit gates), the actualized result can be different than the intended effect due to one or more errors, such as drift or cross-talk. The calibration component 126 can employ one or more calibration techniques (e.g., Floquet calibration and/or XEB calibration) to determine a calibrated pulse schedule for each of the identified multi-qubit gates.

Additionally, the gate component 114 can modify the one or more quantum circuits 122 based on the identified multi-qubit quantum gates. In various embodiments, the gate component 114 can insert a set of quantum gates into the one or more quantum circuits 122 for each identified multi-qubit quantum gate. The set of quantum gates can comprise a pair of inverse quantum gates that compose to the identity gate. For instance, the set of quantum gates can comprise a first quantum gate and a second quantum gate, where the second quantum gate is the inverse of the first quantum gate. Where the set of quantum gates operate ideally (e.g., without error), the computational result achieved by the new quantum circuit 122 can be the same as the original quantum circuit 122 due to the identity nature of the set of inserted quantum gates.

Figure 2B:
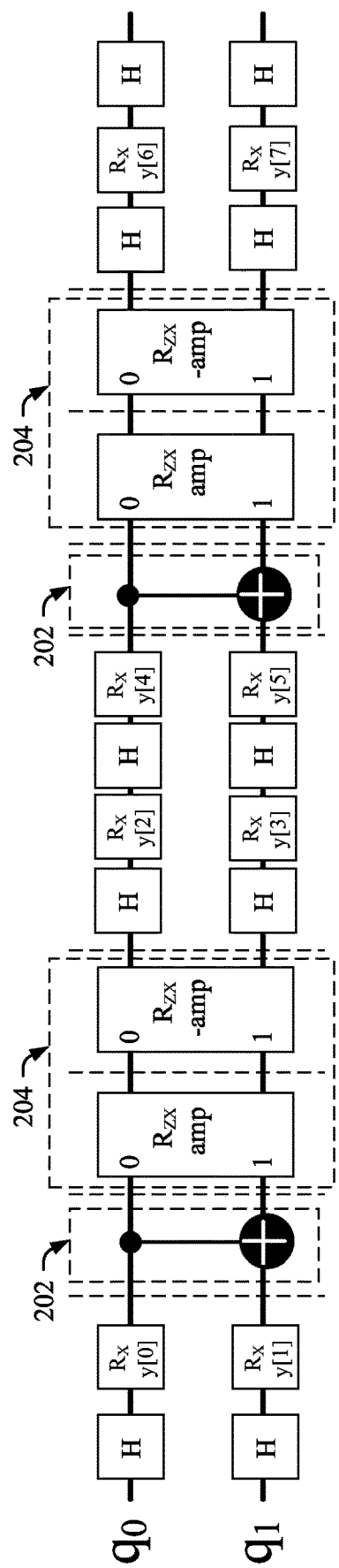
FIG. 2B illustrates a diagram of an example, non-limiting modified quantum circuit generated by inserting one or more sets of quantum gates based on the presence of multi-qubit quantum gates in an original quantum circuit in accordance with one or more embodiments described herein.

FIG. 2B illustrates a diagram of an example, non-limiting modified quantum circuit 122b that can comprise one or more inserted sets of quantum gates, added by the gate component 114 in accordance with one or more embodiments described herein. Repetitive description of like elements employed in other embodiments described herein is omitted for the sake of brevity. The modified quantum circuit 122b shown in FIG. 2B is based on the example quantum circuit 122a shown in FIG. 2A. For each of the multi-qubit quantum gates comprised in the example quantum circuit 122a (e.g., the two CNOT gates 202), the gate component 114 can insert a set of additional quantum gates (e.g., a first quantum gate and its inverse).

In one or more embodiments, the type of quantum gates inserted into the quantum circuit 122 can be based on the physical mechanism effectuating the native multi-qubit quantum gate of the quantum circuit 122. Further, the physical mechanism, and/or hardware architecture, of the multi-qubit quantum gates comprised within the one or more quantum computers 108 can be defined by the calibration component 126 as a part of the calibration information shared with the error mitigation component 110 (e.g., via the one or more networks 104). For example, in the example quantum circuit 122a, the two identified multi-qubit quantum gates are CNOT gates based on RZX rotation established via cross-resonance. Thus, for each CNOT gate 202, the gate component 114 can insert a set of $R_{ZX}$ gates 204; thereby, the gate component 114 can insert a set of quantum gates that correspond to the physical mechanisms that underpin the native multi-qubit gate. For instance, as shown in FIG. 2B, the gate component 114 can insert a set of $R_{ZX}$ gates 204 for each CNOT gate 202 to generate the modified quantum circuit 122b. Each set of $R_{ZX}$ gates 204 can comprise an $R_{ZX}(\theta)$ gate followed by the inverse $R_{ZX}(-\theta)$ gate. As shown in FIG. 2B, the set of quantum gates (e.g., set of $R_{ZX}$ gates 204) can be inserted into the quantum circuit 122 (e.g., example quantum circuit 122a) at a position following the associate native, multi-qubit quantum gate (e.g., CNOT gates 202). In another example, one or more of the identified multi-qubit quantum gates can be implemented as an exchange type gate, such as a tunable coupler gate, in the one or more quantum computers 108, where the gate component 114 can insert one or more sets of quantum gates that correspond to scalable versions of the exchange type gate (e.g., scalable versions of a tunable coupler gate). In one or more embodiments, where a quantum gate is characterized as $\exp(-i\theta G/2)$, the gate component 114 can insert the quantum gate inverse by employing the $-\theta$. The $\theta$ can be the rotation angle and "G" can be the generator (e.g., "G" can be a Hermitian operator), and "i" can be square root of $-1$. For example, an $R_{ZX}$ gate can have the generator ZX, where Z and X are Pauli operators. Thereby, in one or more examples, the gate component 114 can identify the generator G from the native multi-qubit gate and insert a set of quantum gates characterized by $R_G(\theta)$ and $R_G(-\theta)$. For instance, the CNOT gates 202 can have a generator G equal to ZX, and the gate component 114 can insert the set of $R_{ZX}$ gates 204 characterized by $R_{ZX}(\theta)$ and $R_{ZX}(-\theta)$. In another instance, a tunable coupler gate can have the generator G equal to XX+YY, and the gate component 114 can insert a set of quantum gates characterized by $R_{XX+YY}(\theta)$ and $R_{XX+YY}(-\theta)$.

In one or more embodiments, the gate component 114 can reference a gate insertion table 128 to determine the type of set of quantum gates to be inserted into the one or more quantum circuits 122. For example, the gate insertion table 128 can include types of native quantum gates and/or hardware architecture types (e.g., cross-resonance gates, tunable coupler gates, and/or the like) along with an associate insertable gate type. For instance, the gate insertion table 128 can include $R_{ZX}$ gates as an insertable gate type associated with cross-resonance based hardware in which, for example, CNOT gates can be created using $R_{ZX}$ gates. As shown in FIG. 1, the gate insertion table 128 can be stored in the one or more memories 116.

Figure 3:
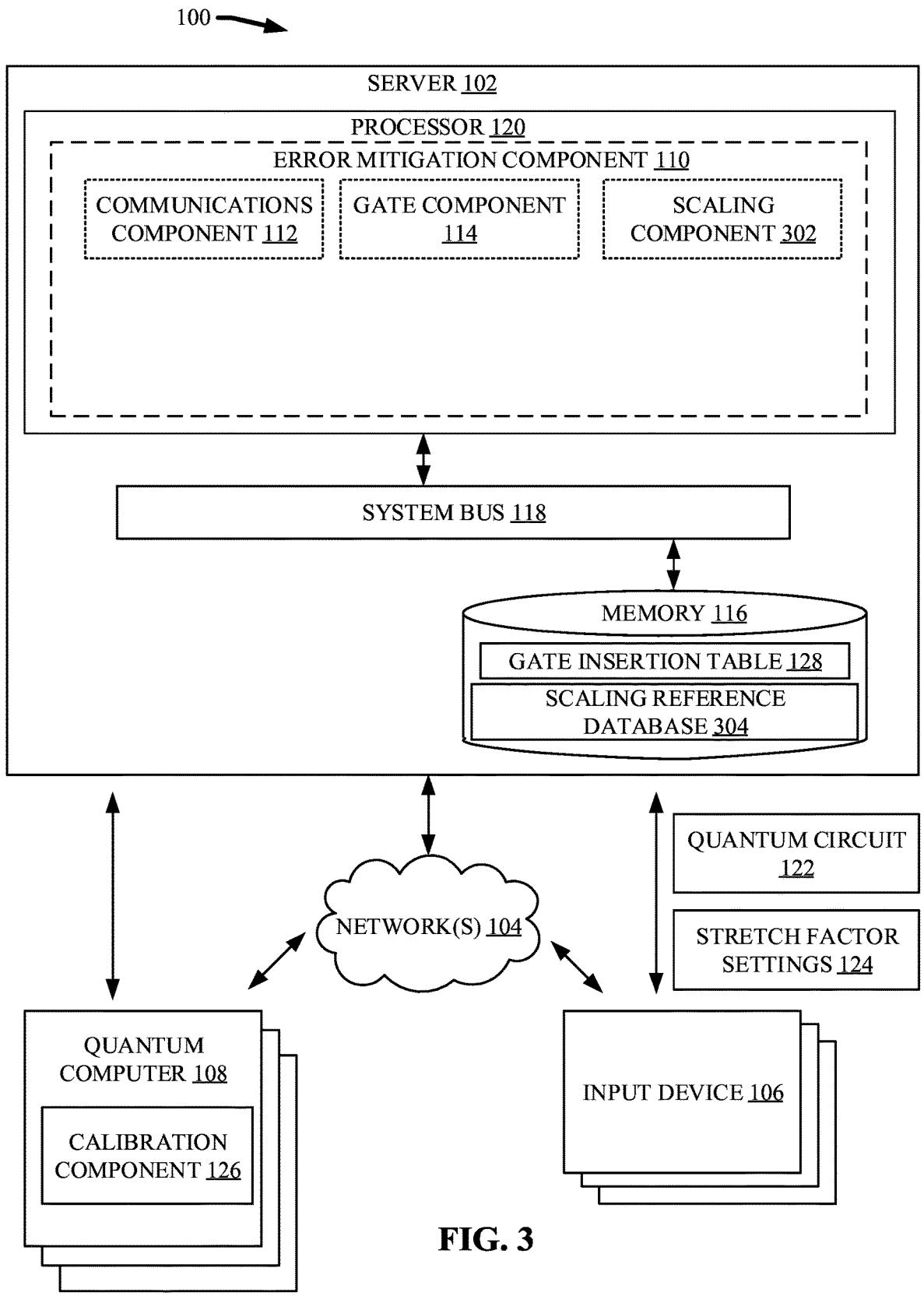
FIG. 3 illustrates a diagram of an example, non-limiting system that can generate one or more scaled pulse schedules to be implemented with a quantum circuit modified to include one or more sets of quantum gates in association with one or more native, multi-qubit quantum gates in accordance with one or more embodiments described herein.

FIG. 3 illustrates a diagram of the example, non-limiting error mitigation component 110 further comprising scaling component 302 in accordance with one or more embodiments described herein. Repetitive description of like elements employed in other embodiments described herein is omitted for the sake of brevity. In various embodiments, the scaling component 302 can generate a scaled pulse schedule for the inserted set of quantum gates based on calibration information of the identified, native multi-qubit quantum gates and the stretch factor settings 124. In one or more embodiments, the pulse schedule can scale a rotation angle of the inserted set of quantum gates to achieve a scaled sets of quantum gates that actualize a target stretch factor value.

In various embodiments, the one or more inserted set of quantum gates can be scaled by the error mitigation component 110 to achieve stretch factor values defined by the one or more stretch factor settings 124. For example, a target stretch factor value for an inserted set of quantum gates can be a function of the rotation angle of the inserted set of quantum gates. For instance, as the rotation angle of the inserted set of quantum gates changes, the stretch factor value associated with the given execution of the modified quantum circuit 122 can also change. In one or more embodiments, the scaling component 302 can set the stretch factor value experienced by the one or more inserted set of quantum gates by defining the rotation angle of the one or more inserted set of quantum gates. For example, the one or more stretch factor settings 124 can define a plurality of stretch factor values, and/or a range of stretch factor values, to be executed with the one or more quantum circuits 122 over multiple execution iterations. The scaling component 302 can determine the rotation angle of the one or more inserted sets of quantum gates for each targeted stretch factor value based on the defined stretch factor value-rotation angle relationship (e.g., which can be defined via one or more equations, charts, tables, and/or graphs stored in one or more scaling reference databases 304 in accordance with the description below).

For example, Equation 1, provided below, can characterize the relationship between stretch factor value and rotation angle for a set of $R_{ZX}$ gates 204 inserted into a quantum circuit 122 based on the identification of a CNOT gate 202 in the quantum circuit 122 (e.g., as exemplified in FIGS. 2A-2B).

$$c = \frac{\tau_{cs} + 2 \cdot \tau(\theta)}{\tau_{cx}} \quad (1)$$

Where "c" can be the stretch factor value, "$\tau_{cx}$" can be the duration of the native CNOT gate (e.g., as defined by the calibration component 126), and "$2 \cdot \tau(\theta)$" can be duration of the stretched set of quantum gates (e.g., the stretched $R_{ZX}(\theta)$ gate and its inverse gate).

In various embodiments, the relationship between gate rotation angle and stretch factor value for a variety of quantum gate types can be defined in one or more scaling reference databases 304. For example, the one or more scaling reference databases 304 can include a plurality of quantum gate types that can be inserted into the one or more quantum circuits 122 by the gate component 114. In association with each quantum gate type, the one or more scaling reference databases 304 can include equations, graphs, tables, and/or the like that characterize a mathematical relationship between the stretch factor value experienced by the given quantum gate and the rotation angle of the given quantum gate. In one or more embodiments, the one or more scaling reference databases 304 can be populated via the one or more input devices 106. Also, the one or more scaling reference databases 304 can be stored in the one or more memories 116.

Figure 4:
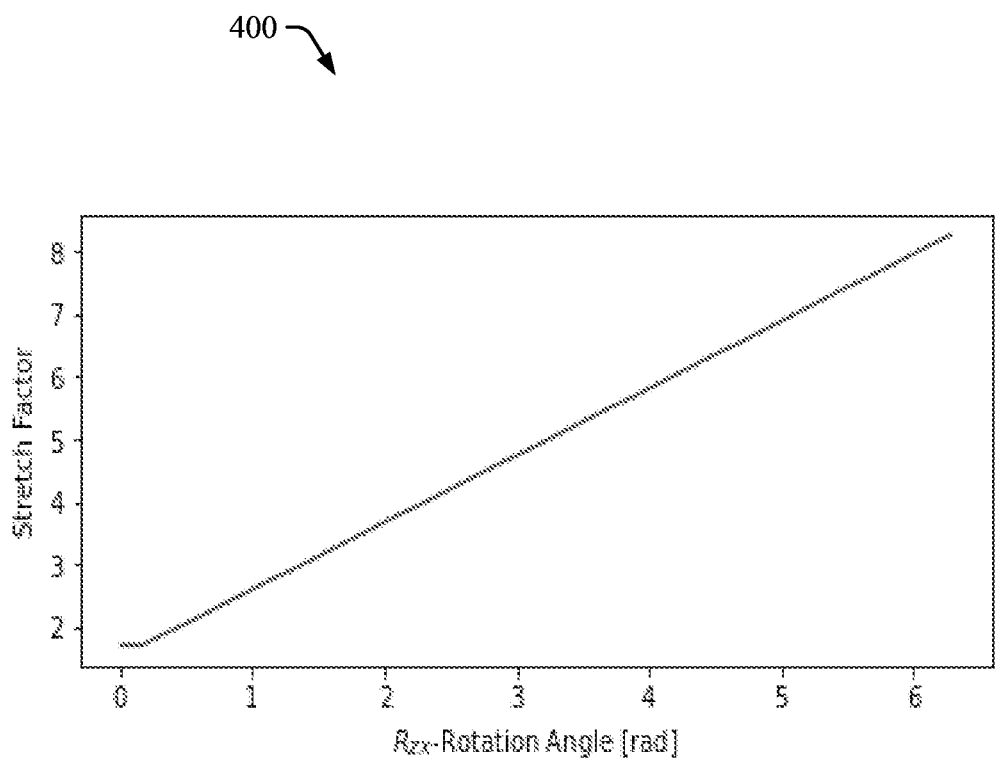
FIG. 4 illustrates a diagram of an example, non-limiting graph that can characterize a stretch factor value-rotation angle relationship that can be exhibited by one or more sets of quantum gates inserted into a quantum circuit in accordance with one or more embodiments described herein.

FIG. 4 illustrates a diagram of an example, non-limiting graph 400 that can illustrate the stretch factor value-rotation angle relationship characterized by Equation 1 in accordance with one or more embodiments described herein. Repetitive description of like elements employed in other embodiments described herein is omitted for the sake of brevity. In various embodiments, graph 400 can be included in the one or more scaling reference databases 304, and/or can be referenced by the scaling component 302 to determine the rotation angle for the inserted set of $R_{ZX}$ gates 204 for one or more target stretch factor values.

As shown in FIG. 4, in various embodiments the range of possible stretch factors that can be implemented on an inserted set of quantum gates can be limited by one or more properties of the associate native, multi-qubit quantum gate. For instance, the exemplary set of $R_{ZX}$ gates 204 characterized by graph 400 can implement a minimum stretch factor value of 1.8. In various embodiments, the minimum and/or maximum stretch factor value that can be achieved with regards to an inserted set of quantum gates can be based on the parameters (e.g., included in the calibration information determined by the calibration component 126) of the native, multi-qubit quantum gate of the initial quantum circuit 122. For instance, in an echoed cross-resonance gate the minimum stretch factor value achievable without pulse calibration can be determined by the flanks of the single and two-qubit pulses. The maximum stretch factor value can be set based on hardware capabilities of the one or more quantum computers 108; including, but not limited to: control electronics memory, coherence times, imposed constraints (e.g., total schedule duration), a combination thereof, and/or the like.

In various embodiments, the scaling component 302 can define a set of target stretch factor values that can be: within the minimum and/or maximum thresholds for the one or more inserted sets of quantum gates; and within the plurality and/or range of stretch factor values defined by the one or more stretch factor settings 124. Further, the scaling component 302 can determine the quantum gate rotation angle associated with each target stretch factor value of the set of target stretch factor values.

In one or more embodiments, the scaling component 302 can further generate a set of pulse schedules to implement each of the determined quantum gate rotation angles. The set of pulse schedules can include pulse schedules scaled from the calibrated pulse schedule of the native, multi-qubit quantum gate of the initial quantum circuit 122 (e.g., example quantum circuit 122a) to achieve the given rotation angle of the associate inserted set of quantum gates of the adjusted quantum circuit 122 (e.g., modified quantum circuit 122b). In various embodiments, the scaling component 302 can employ one or more scaling techniques to the calibrated pulse schedule of the native, multi-qubit quantum gate to generate scaled pulse schedules for the associate inserted set of quantum gates. Example scaling techniques that can be employed by the scaling component 302 to generate the scaled pulse schedule can include, but are not limited to: employing a single cross-resonance pulse, employing a rotary term, employing a pulse echo, scaling the flat-top portion of a square pulse with Gaussian flanks, scaling a tunable coupler pulse generating an exchange-type gate and/or a controlled phase gate, a combination thereof, and/or the like.

In one or more embodiments, the scaling component 302 can implement the one or more scaling techniques to alter one or more parameters of the calibrated pulse schedule of the native, multi-qubit quantum gate. For example, the one or more scaling techniques can alter the amplitude and/or cycle time of the calibrated pulse schedule. Thereby, the scaled pulse schedules generated by the scaling component 302 can result in alternate execution durations for the one or more quantum circuits 122.

Figure 5:
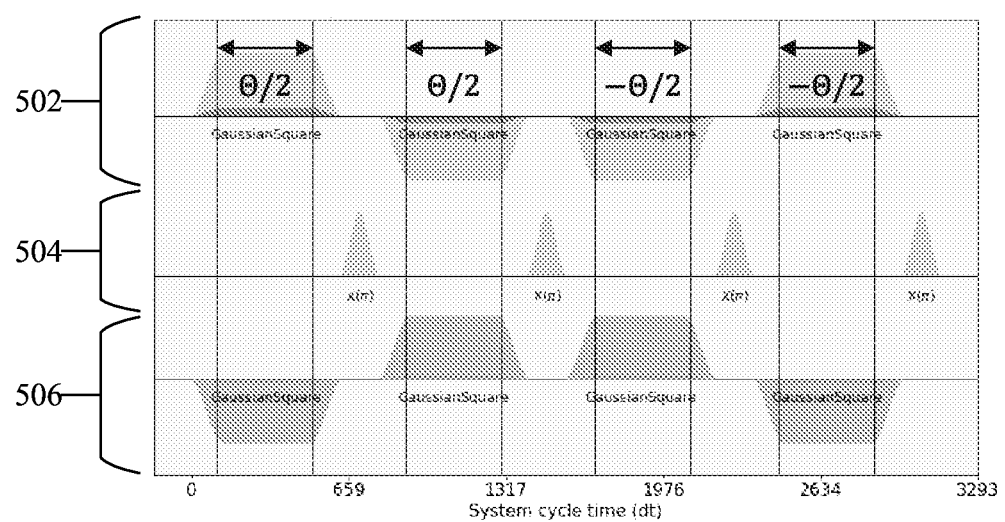
FIG. 5 illustrates a diagram of example, non-limiting scaled pulse schedules that can be implemented on one or more quantum circuits modified to include one or more sets of scalable quantum gates in accordance with one or more embodiments described herein.

FIG. 5 illustrates a diagram of example, non-limiting scaled pulse schedules that can be generated by the scaling component 302 to be implemented with one or more inserted sets of quantum gates in accordance with one or more embodiments described herein. Repetitive description of like elements employed in other embodiments described herein is omitted for the sake of brevity. FIG. 5 depicts three exemplary scaled pulse schedules that can be generated by the scaling component 302 to be implemented on the one or more inserted set of $R_{ZX}$ gates 204 of the modified quantum circuit 122b to achieve one or more of the stretch factors and/or rotation angles characterized by graph 400. Each of the exemplary scaled pulse schedules can be implemented across both quantum gates of the set of quantum gates (e.g., the first inserted quantum gate and its inverse).

As shown in FIG. 5, the first example scaled pulse schedule 502 can be generated by the scaling component 302 by adjusting one or more parameters, such as the width, of the cross-resonance pulses. The second example scaled pulse schedule 504 can be generated by the scaling component 302 by adding one or more pulse echoes to the calibrated pulse schedule. The third example scaled pulse schedule 506 can be generated by the scaling component 302 by employing a rotary term to modify the waveform of the calibrated pulse schedule. In various embodiments, the one or more inserted sets of quantum gates can be implemented on scaled pulse schedules generated via multiple scaling techniques. For example, the scaling component 302 can implement a combination of the first example scaled pulse schedule 502, the second example scaled pulse schedule 504, and/or the third scaled pulse schedule 506. For instance, the scaling component 302 can adjust the waveform of a calibrated pulse schedule and introduce one or more echo pulses to generate a scaled pulse schedule. In another instance, the scaling component 302 can adjust the waveform of a calibrated pulse schedule and employ one or more rotary terms to generate a scaled pulse schedule. In a further instance, the scaling component can introduce one or more echoed pulses and/or rotary terms to a calibrated pulse schedule to generate the one or more scaled pulse schedules.

Figure 6:
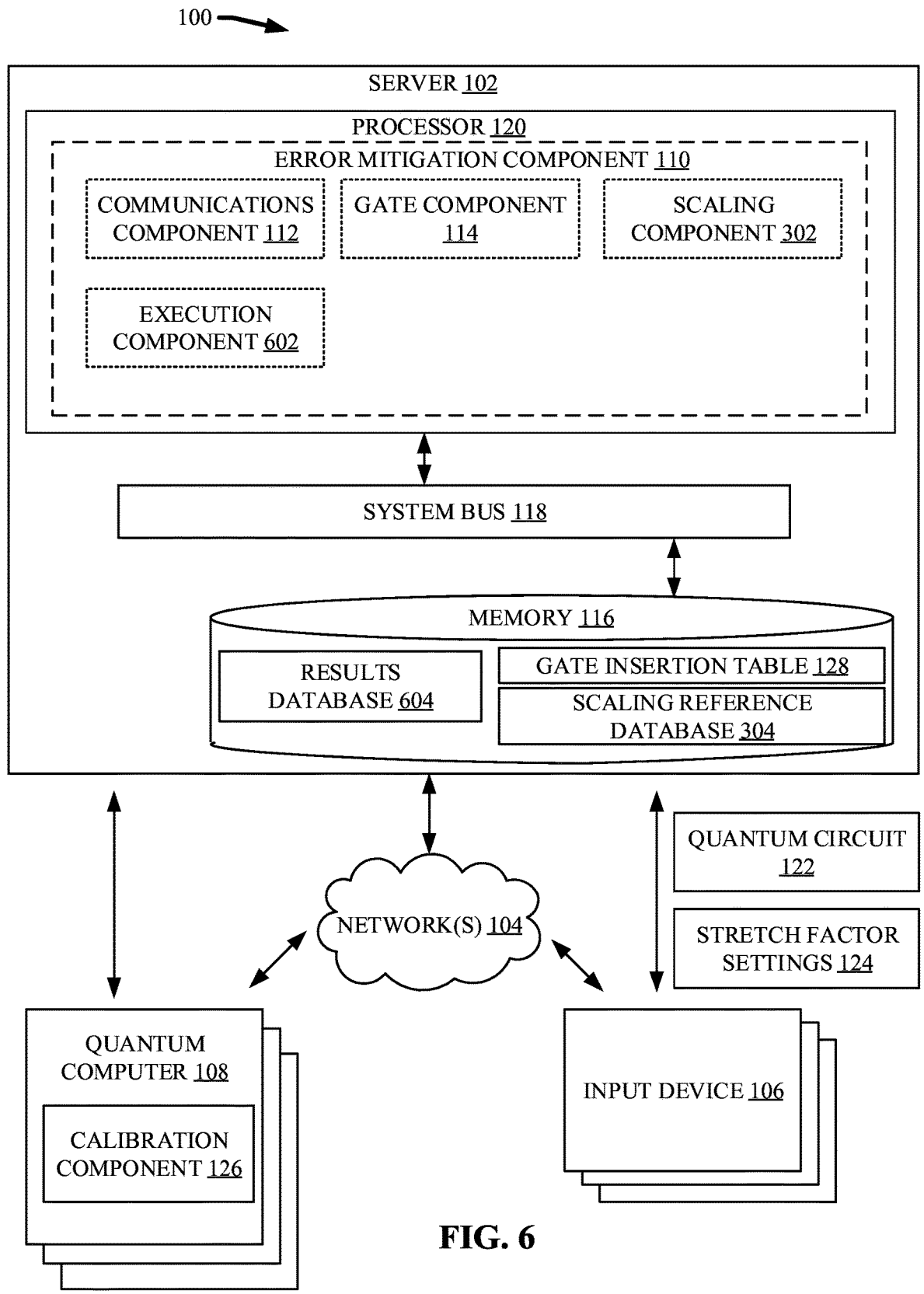
FIG. 6 illustrates a diagram of an example, non-limiting system that execute a modified quantum circuit with various scaled pulse schedules over multiple iterations in accordance with one or more embodiments described herein.

FIG. 6 illustrates a diagram of the example, non-limiting error mitigation component 110 further comprising execution component 602 in accordance with one or more embodiments described herein. Repetitive description of like elements employed in other embodiments described herein is omitted for the sake of brevity. In various embodiments, the execution component 602 can execute the one or more adjusted quantum circuits 122 (e.g., adjusted to include the one or more inserted sets of quantum gates) multiple times, with each iteration employing a respective scaled pulse schedule generated by the scaling component 302.

In one or more embodiments, the execution component 602 can execute the adjusted quantum circuit 122 (e.g., comprising the one or more inserted sets of quantum gates) multiple times on the one or more quantum computers 108, where each execution iteration can be associated with a respective target stretch factor value. Also, each target stretch factor value can be associated with a rotation angle (e.g., determined by the scaling component 302) for the one or more inserted sets of quantum gates. Further, each rotation angle can be implemented via a respective scaled pulse schedule generated by the scaling component 302, which can be scaled based on the calibrated pulse schedule (e.g., determined by the calibration component 126) of the one or more native, multi-qubit quantum gates identified by the gate component 114.

For example, the execution component 602 can perform a first execution the adjusted quantum circuit 122 (e.g., comprising the one or more inserted sets of quantum gates) on the one or more quantum computers 108. During the first execution, the one or more quantum computers 108 can drive the one or more inserted sets of quantum gates in accordance with a first scaled pulse schedule to achieve a first stretch factor value (e.g., from a set of stretch factor values set by the scaling component 302 based on, for example, the stretch factor settings 124). Further, the execution component 602 can perform a second execution of the same adjusted quantum circuit 122 (e.g., comprising the one or more inserted sets of quantum gates) on the one or more quantum computers 108. During the second execution, the one or more quantum computers 108 can drive the one or more inserted sets of quantum gates in accordance with a second scaled pulse schedule to achieve a second stretch factor value (e.g., and/or to establish a second gate rotation angle, different than the gate rotation angle established during the first execution). Likewise, the execution component 602 can perform any number of additional executions of the same adjusted quantum circuit 122, with each execution implementing a different scaled pulse schedule.

With each execution of the adjusted quantum circuit 122, the execution component 602 can collect the computational results outputted by the one or more quantum computers 108. As each execution is associated with a different stretch factor value, the computational results of each execution can vary due to the inclusion of different amounts of noise. Further, the execution component 602 can generate a results database 604 associated with the one or more adjusted quantum circuits 122. For example, the results database 604 can include the computational results from each execution along with the target stretch factor value associated with each execution of the one or more adjusted quantum circuits 122. For instance, the one or more results databases 604 can be stored in the one or more memories 116.

Figure 7:
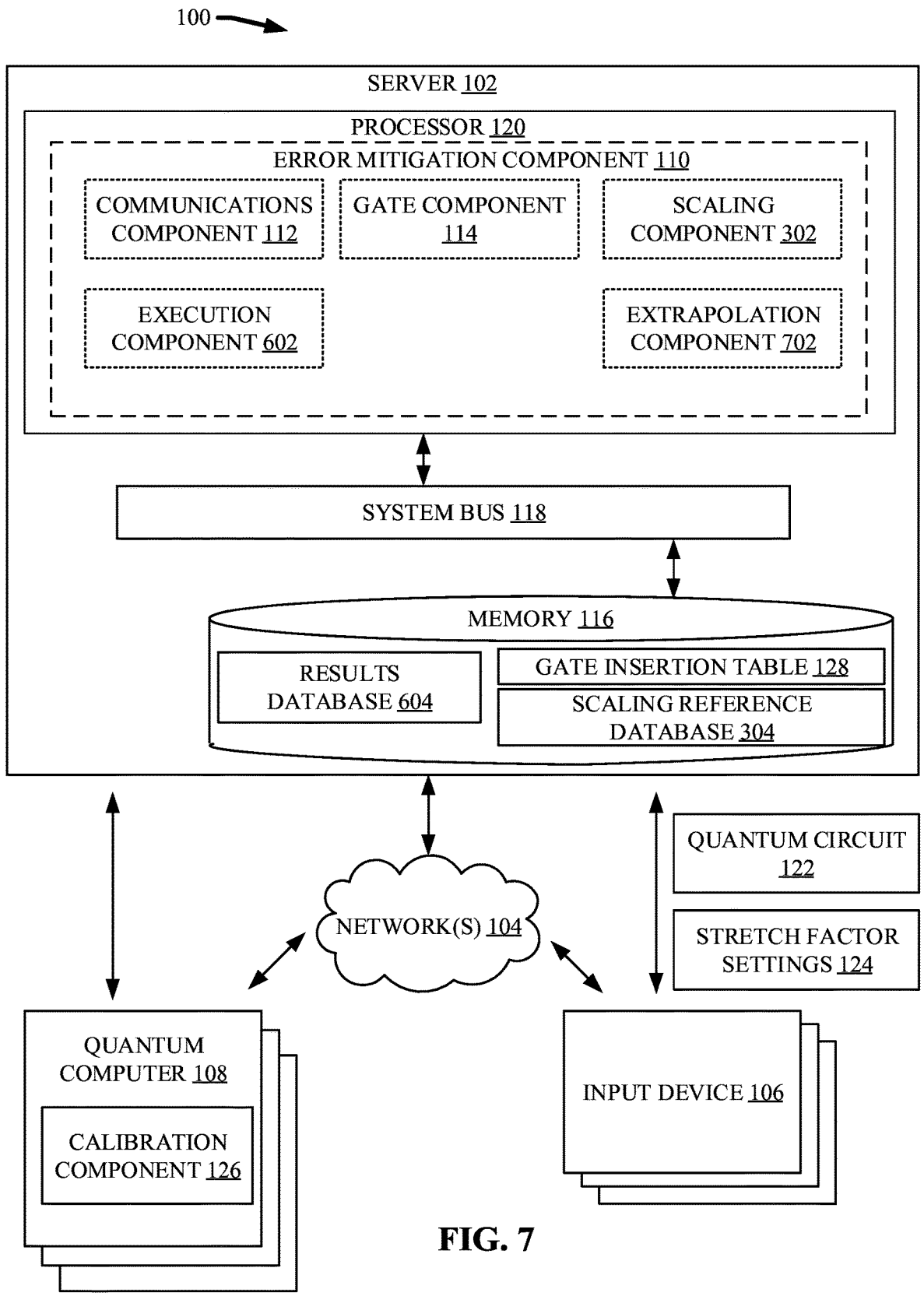
FIG. 7 illustrates a diagram of an example, non-limiting system that can employ a Richardson extrapolation algorithm to determine an error mitigated computational result associated with execution of a quantum circuit with various scaled pulse schedules in accordance with one or more embodiments described herein.

FIG. 7 illustrates a diagram of the example, non-limiting error mitigation component 110 further comprising extrapolation component 702 in accordance with one or more embodiments described herein. Repetitive description of like elements employed in other embodiments described herein is omitted for the sake of brevity. In various embodiments, the extrapolation component 702 can employ one or more extrapolation techniques with regards to the one or more results databases 604 to determine a near-zero noise computation associated with the one or more given quantum circuits 122. Example extrapolation techniques that can be employed by the extrapolation component 702 can be Richardson extrapolation or another extrapolation method. For instance, the extrapolation component 702 can employ a Richardson extrapolation algorithm to extrapolate the computational results included in the one or more results databases 604 to a zero-noise limit.

Figure 8:
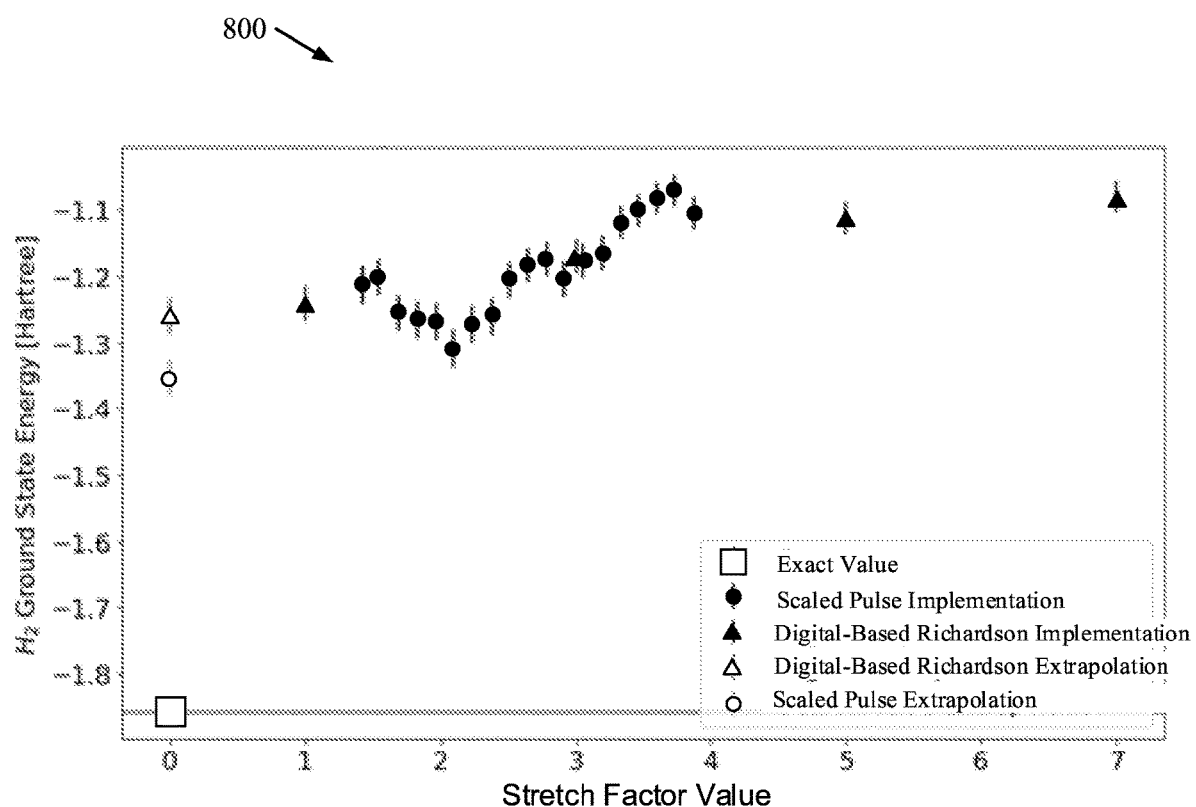
FIG. 8 illustrates a diagram of an example, non-limiting graph that can demonstrate the enhanced stretch factor resolution that can be achieved by various quantum error mitigation techniques in accordance with one or more embodiments described herein.

FIG. 8 illustrates a diagram of an example, non-limiting graph 800 that can demonstrate the enhanced resolution achievable by the system 100 as compared to typical error mitigation techniques in accordance with one or more embodiments described herein. Repetitive description of like elements employed in other embodiments described herein is omitted for the sake of brevity. Graph 800 can regard one or more quantum circuits 122 (e.g., example quantum circuit 122a) utilized to calculate the ground state energy of a hydrogen molecule. The square symbol can represent an exact value of the ground state energy. The black circles can represent respective executions of the example quantum circuit 122a using various scaled pulse schedules in accordance with the various embodiments described herein. As shown in graph 800, each scaled pulse schedule can be associated with a different stretch factor value and can result in a different computational result. The black triangles can represent executions of the example quantum circuit 122a using a digital-based Richardson extrapolation technique. Further, the white circle represents the extrapolated result determined from the scaled pulse schedule implementations using a Richardson extrapolation algorithm. Also, the white triangle represents the extrapolated result determined from the digital-based Richardson implementations using the Richardson extrapolation algorithm.

A comparison of the scaled pulse schedule implementations versus the digital-based Richardson extrapolation implementations shows that the various embodiments described herein can achieve a greater plurality of stretch factor values. Additionally, the greater plurality of stretch factor values can be densely located within a finer range (e.g., from the minimum stretch factor value implemented to the maximum stretch factor value implemented). In contrast, the typical stretch factor value implementation is limited to fewer available stretch factor values across a wider range. Further, the enhanced resolution of the implemented set of target stretch factor values enabled the extrapolation of a more accurate computation of the ground state energy.

Figure 9:
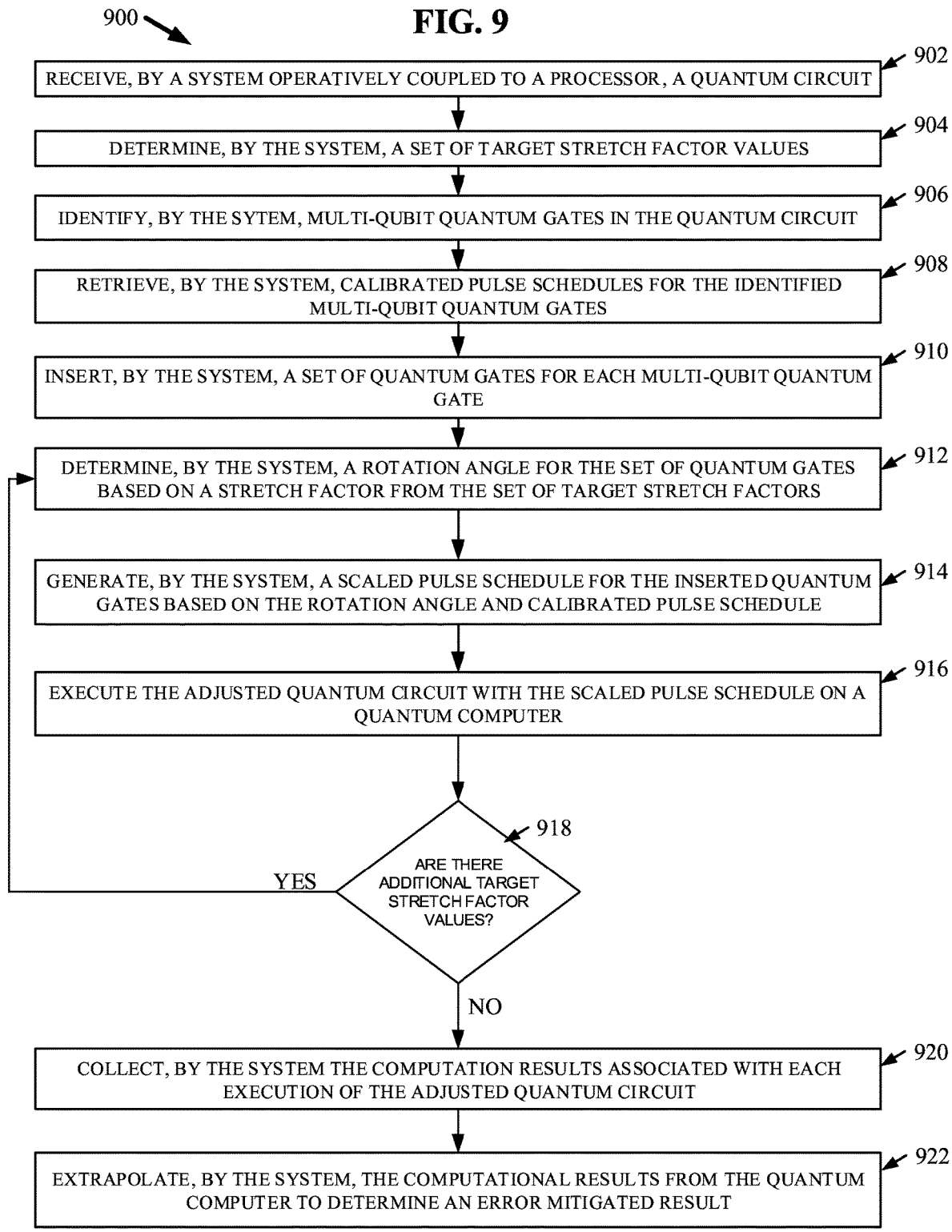
FIG. 9 illustrates a flow diagram of an example, non-limiting computer-implemented method that can facilitate quantum error mitigation via the execution of various scaled pulse schedules on one or more quantum circuits modified to include one or more sets of quantum gates in accordance with one or more embodiments described herein.

FIG. 9 illustrates a flow diagram of an example, non-limiting computer-implemented method 900 that can be implemented by the system 100 to perform quantum error mitigation in accordance with one or more embodiments described herein. Repetitive description of like elements employed in other embodiments described herein is omitted for the sake of brevity.

At 902, the computer-implemented method 900 can comprise receiving (e.g., via communications component 112), by a system 100 operatively coupled to a processor 120, one or more quantum circuits 122. In various embodiments, the one or more quantum circuits 122 can be entered into the system 100 via one or more input devices 106. Also, the one or more quantum circuits 122 can delineate one or more quantum operations and/or gates for the execution of one or more quantum algorithms on one or more quantum computers 108.

At 904, the computer-implemented method 900 can comprise determining (e.g., via scaling component 302), by the system 100, a set of target stretch factor values. In various embodiments, the stretch factor values can define a modification to the pulse schedule driving one or more multi-qubit quantum gates during execution of the one or more quantum circuits 122. In one or more embodiments, one or more input devices 106 can be employed to enter stretch factor settings 124 into the system 100, where the stretch factor settings 124 can include a plurality, and/or a range, of stretch factor values targeted for implementation in one or more error mitigation techniques.

At 906, the computer-implemented method 900 can comprise identifying (e.g., via gate component 114), by the system 100, one or more multi-qubit quantum gates comprised within the one or more quantum circuits 122. For instance, the one or more multi-qubit quantum gates can be two-qubit quantum gates. Example types of multi-qubit quantum gates can include, but are not limited to: cross-resonance gates (e.g., CNOT gates), Pauli gates, entangling gates, exchange-like gates, controlled-phase gates, multi-control phase gates, a combination thereof, and/or the like. At 908, the computer-implemented method 900 can comprise retrieving (e.g., via the calibration component 126), by the system 100, calibrated pulse schedules for the one or more identified multi-qubit quantum gates. For example, the one or more quantum computers 108 can calibrate the quantum hardware associated with the multi-qubit quantum gates defined by the one or more quantum circuits 122 and return the calibration data to the error mitigation component 110. At 910, the computer-implemented method 900 can comprise inserting (e.g., via gate component 114), by the system 100, a set of quantum gates into the one or more quantum circuits 122 for each identified multi-qubit quantum gate native to the quantum circuits. In various embodiments, each inserted set of quantum gates can comprise a first quantum gate and a second quantum gate that is the inverse of the first quantum gate, such that the set of quantum gates can compose to the identity of the original quantum circuit 122.

At 912, the computer-implemented method 900 can comprise determining (e.g., via scaling component 302), by the system 100, a rotation angle for the inserted set of quantum gates based on a stretch factor from the set of target stretch factors. For example, one or more stretch factor value-rotation angle relationships for the inserted set of quantum gates can be defined via one or more equations, charts, tables, and/or the like included in one or more gate insertion tables 128 in accordance with one or more embodiments described herein. For instance, the determining at 910 can employ a graph, such as graph 400, that can characterize how the stretch factor value achieved by the inserted set of quantum gates can be based on the gate rotation angle.

At 914, the computer-implemented method 900 can comprise generating (e.g., via scaling component 302), by the system 100, a scaled pulse schedule for the inserted sets of quantum gates based on the rotation and/or calibrated pulse schedule. In various embodiments, the generating at 914 can employ one or more scaling techniques to generate scaled pulse schedules that can be implemented on the inserted sets of quantum gates. For example, the scaled pulse schedules can be generated by modifying the waveform of the calibrated pulse schedule, introducing one or more pulse echoes, and/or employing one or more rotary terms. In one or more embodiments, scaling the pulse schedule can, for example, alter the cycle duration associated with executing the one or more quantum circuits 122.

At 916, the computer-implemented method 900 can comprise executing (e.g., via execution component 602), by the system 100, the one or more adjusted quantum circuits 122 (e.g., comprising the one or more sets of inserted quantum gates) with the scaled pulse schedule on one or more quantum computers 108. At 918, the computer-implemented method 900 can assess whether there are additional target stretch factor values to be implemented. Where there are additional target stretch factor values to be implemented, the computer-implemented method 900 can proceed to repeat 912-916. For instance, the computer-implemented method 900 can comprise determining a gate rotation angle, generating a scaled pulse schedule, and executing the adjusted quantum circuit 122 with regards to each target stretch factor value of the set of target stretch factor values. Thereby, the computer-implemented method 900 can execute the adjusted quantum circuit 122 over multiple iterations, with each iteration achieving a different stretch factor value via various scaled pulse schedules.

Where there are no additional target stretch factor values to be implemented, the computer-implemented method 900 can proceed to 920. At 920, the computer-implemented method 900 can comprise collecting (e.g., via execution component 602), by the system 100, the computation results associated with each execution of the one or more adjusted quantum circuits. At 922, the computer-implemented method 900 can comprise extrapolating (e.g., via extrapolation component 702), by the system 100, the computational results from the one or more quantum computers 108 to determine an error mitigated result. For example, a Richardson extrapolation algorithm can be employed to extrapolate a zero-noise result from the multiple executions of the one or more adjusted quantum circuits 122.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
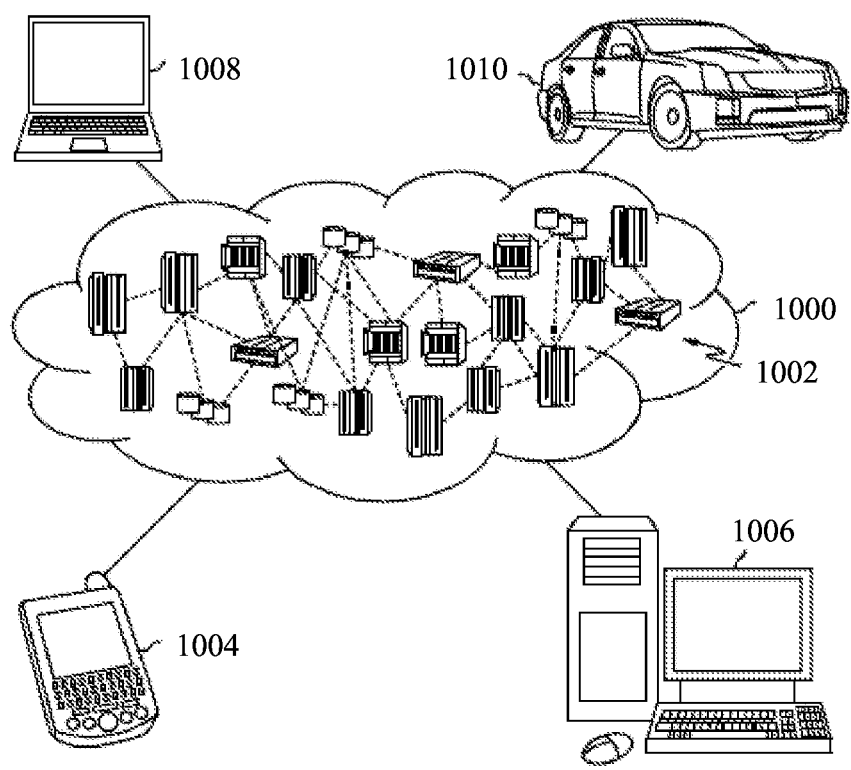
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
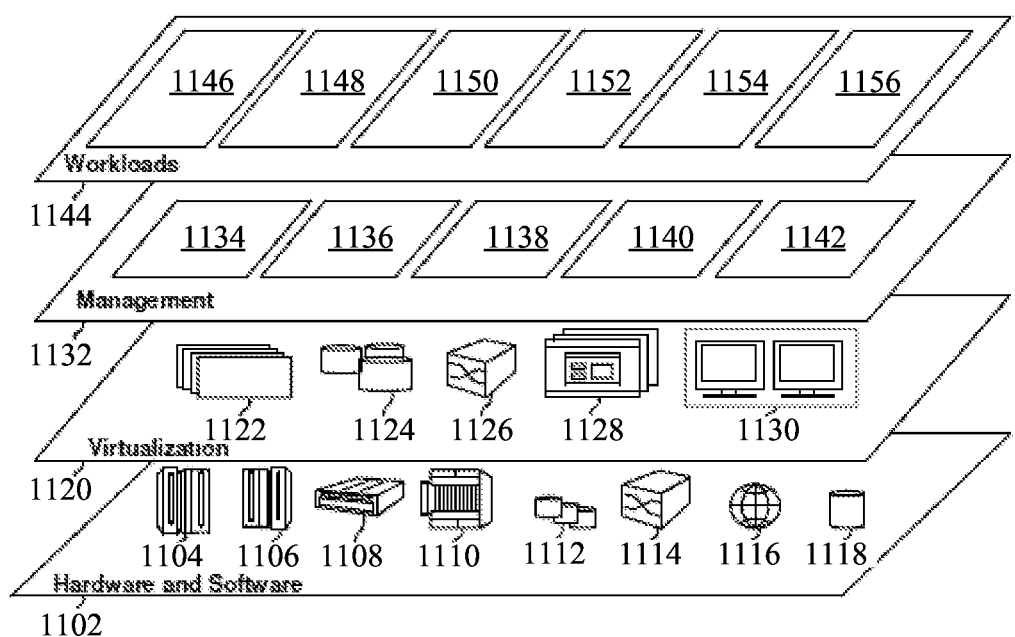
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for the sake of brevity. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and quantum error mitigation 1156. Various embodiments of the present invention can utilize the cloud computing environment described with reference to FIGS. 10 and 11 to execute one or more quantum error mitigation techniques for one or more quantum circuits in accordance with one or more embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
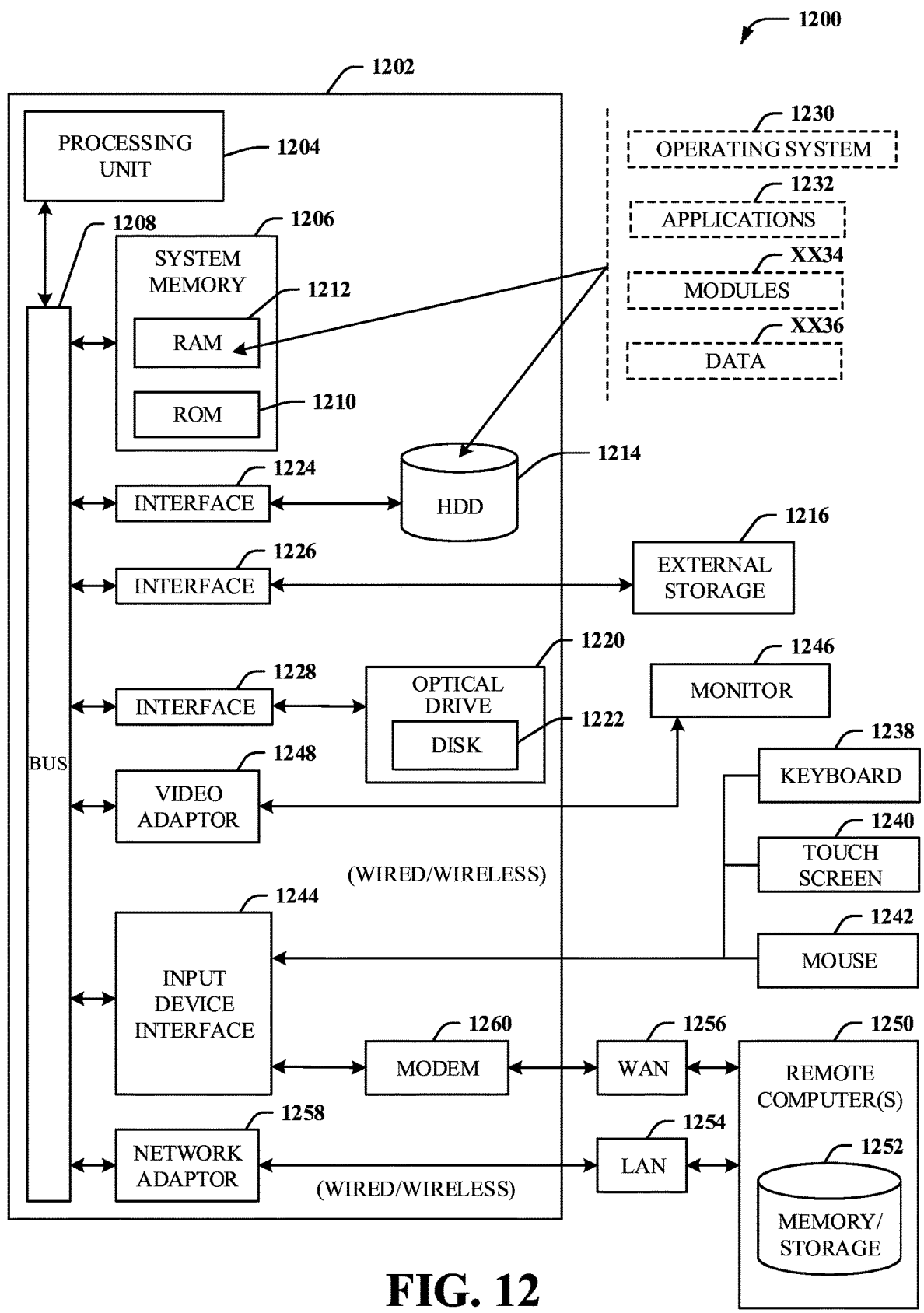
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, a combination thereof, and/or the like) and an optical disk drive 1220 (e.g., which can read or write from a CD-ROM disc, a DVD, a BD, and/or the like). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, and/or the like.

A monitor 1246 or other type of display device can be also connected to the system bus 1208 via an interface, such as a video adapter 1248. In addition to the monitor 1246, a computer typically includes other peripheral output devices (not shown), such as speakers, printers, a combination thereof, and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      an error mitigation component that:
         identifies a multi-qubit quantum gate in a quantum circuit, and
         adds a set of scaled quantum gates at a position after the multi-qubit quantum gate in the quantum circuit for error mitigation, wherein the set of scaled quantum gates comprises a first quantum gate and a second quantum gate that is an inverse of the first quantum gate, and wherein the set of scaled quantum gates has a rotation angle based on a pulse schedule to achieve a target stretch factor.

2. The system of claim 1, wherein the rotation angle of the set of scaled quantum gates controls an amount of noise experienced by the quantum circuit.

3. The system of claim 1, wherein the multi-qubit quantum gate comprises two controlled-NOT (CNOT) gates, and the position is adjacent to the multi-qubit quantum gate in the quantum circuit.

4. The system of claim 1, wherein the set of scaled quantum gates comprises an $R_{ZX}$ gate implemented by: a single cross-resonance pulse, a cross-resonance pulse with a rotary term, an echoed cross-resonance pulse with the rotary term, or a direct CX gate.

5. The system of claim 1, further comprising:
   a calibration component that performs a calibration of the multi-qubit quantum gate and determines a pulse implementation of the multi-qubit quantum gate.

6. The system of claim 5, further comprising:
   a scaling component that generates the pulse schedule for the set of scaled quantum gates based on the pulse implementation of the multi-qubit quantum gate and the target stretch factor, wherein the pulse schedule scales the rotation angle of quantum gates of the set of scaled quantum gates.

7. The system of claim 1, further comprising:
   an execution component that executes the quantum circuit with the set of scaled quantum gates.

8. The system of claim 7, further comprising:
   an extrapolation component that extrapolates results achieved by the execution component to mitigate noise of the quantum circuit.

9. A computer-implemented method, comprising:
   identifies, by a system operatively coupled to a processor, a multi-qubit quantum gate in a quantum circuit; and
   adding, by the system, a set of scaled quantum gates at a position after the multi-qubit quantum gate in the quantum circuit for error mitigation, wherein the set of scaled quantum gates comprises a first quantum gate and a second quantum gate that is an inverse of the first quantum gate, and wherein the set of scaled quantum gates has a rotation angle based on a pulse schedule to achieve a target stretch factor.

10. The computer-implemented method of claim 9, wherein the rotation angle of the set of scaled quantum gates controls an amount of noise experienced by the quantum circuit.

11. The computer-implemented method of claim 9, wherein the multi-qubit quantum gate comprises two controlled-NOT (CNOT) gates, and the position is adjacent to the multi-qubit quantum gate in the quantum circuit.

12. The computer-implemented method of claim 9, wherein the set of scaled quantum gates comprises an $R_{ZX}$ gate implemented by: a single cross-resonance pulse, a cross-resonance pulse with a rotary term, an echoed cross-resonance pulse with the rotary term, or a direct CX gate.

13. The computer-implemented method of claim 9, further comprising:

extracting, by the system, a calibration of the multi-qubit quantum gate to determine a pulse implementation of the multi-qubit quantum gate.

14. The computer-implemented method of claim 13, further comprising:

generating, by the system, the pulse schedule for the set of scaled quantum gates based on the pulse implementation of the multi-qubit quantum gate and the target stretch factor, wherein the pulse schedule scales the rotation angle of the set of quantum gates to define of the set of scaled quantum gates.

15. The computer-implemented method of claim 9, further comprising:

executing, by the system, the quantum circuit with the set of scaled quantum gates; and extrapolating, by the system, results from the executing to mitigate noise of the quantum circuit.

16. A computer program product for mitigating error of a quantum circuit, the computer program product comprising a computer readable storage medium having program instructions embodied therewith, the program instructions executable by a processor to cause the processor to:

identify a multi-qubit quantum gate in the quantum circuit; and add a set of scaled quantum gates at a position after the multi-qubit quantum gate in the quantum circuit, wherein the set of scaled quantum gates comprises a first quantum gate and a second quantum gate that is an inverse of the first quantum gate, and wherein the set of scaled quantum gates has a rotation angle based on a pulse schedule to achieve a target stretch factor.

17. The computer program product of claim 16, wherein the rotation angle of the set of scaled quantum gates controls an amount of noise experienced by the quantum circuit.

18. The computer program product of claim 16, wherein the multi-qubit quantum gate comprises two controlled-NOT (CNOT) gates, and the position is adjacent to the multi-qubit quantum gate in the quantum circuit.

19. The computer program product of claim 16, wherein the program instructions further cause the processor to:

extract a calibration of the multi-qubit quantum gate to determine a pulse implementation of the multi-qubit quantum gate; and generate the pulse schedule for the set of scaled quantum gates based on the pulse implementation of the multi-qubit quantum gate and the target stretch factor, wherein the pulse schedule scales the rotation angle of quantum gates of the set of scaled quantum gates.

20. The computer program product of claim 16, wherein the program instructions further cause the processor to:

execute the quantum circuit with the set of scaled quantum gates; and extrapolate results achieved by execution of the quantum circuit to mitigate noise of the quantum circuit.

* * * * *